(No Model.)
S. O. JONES.
PISTON VALVE.
No. 525,462. Patented Sept. 4, 1894.
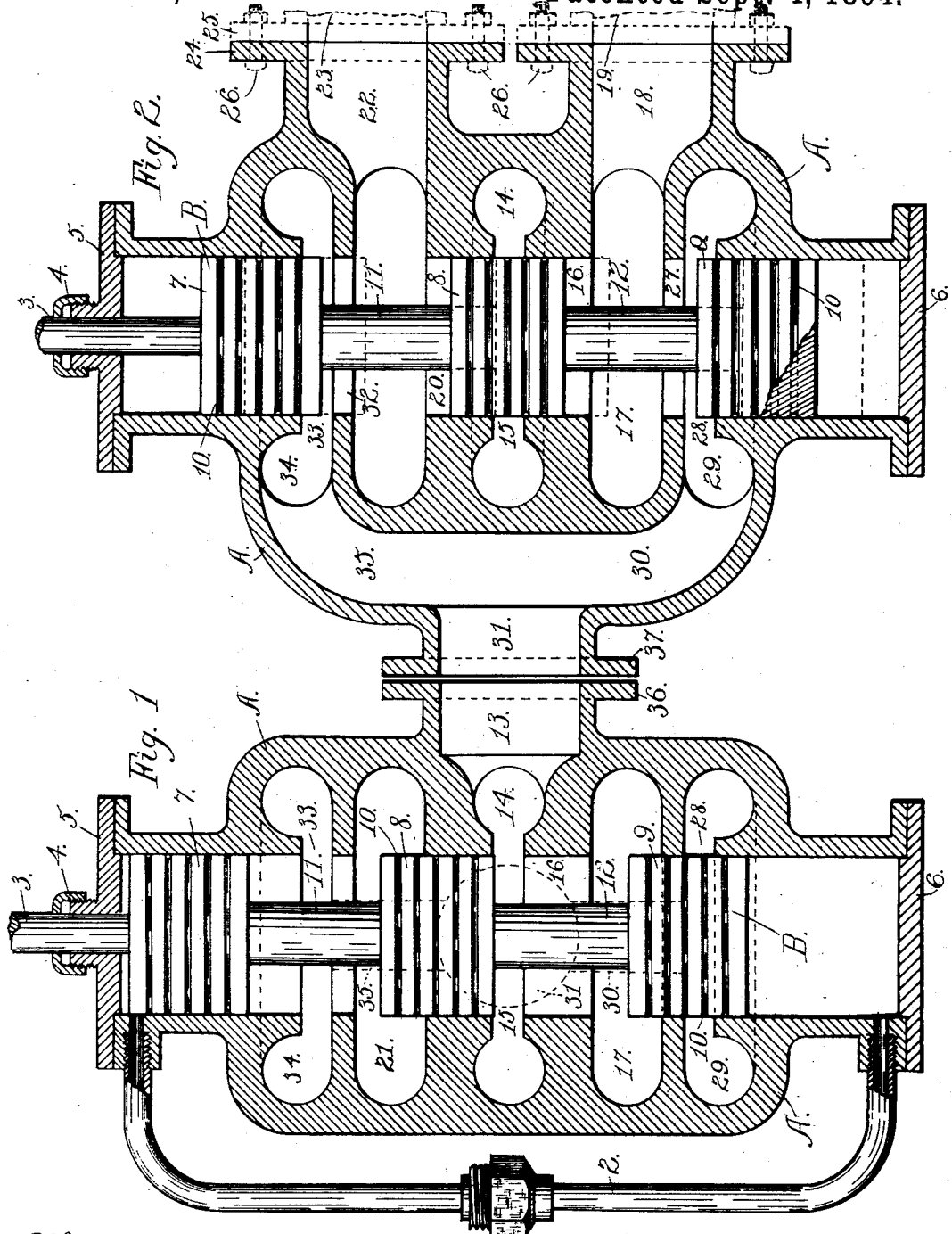
Witnesses:
F. G. Bradbury.
H. S. Johnson.
Inventor:
Samuel O. Jones.
per F. D. Merwin
Attorney.

UNITED STATES PATENT OFFICE.

SAMUEL O. JONES, OF STILLWATER, MINNESOTA, ASSIGNOR OF ONE-HALF TO GEORGE H. ATWOOD, OF SAME PLACE.

PISTON-VALVE.

SPECIFICATION forming part of Letters Patent No. 525,462, dated September 4, 1894.

Application filed January 8, 1894. Serial No. 496,040. (No model.)

*To all whom it may concern:*

Be it known that I, SAMUEL O. JONES, of Stillwater, Washington county, Minnesota, have invented certain Improvements in Piston-Valves, of which the following is a specification.

My invention relates to improvements in steam piston valves, and consists in the construction and combination hereinafter particularly described and claimed.

In the accompanying drawings forming part of this specification: Figure 1 is a central, longitudinal section of the valve chest showing the inlet steam port, the valve itself being shown at one end of the chest with the live steam ports full open at the opposite end, and Fig. 2 is a similar section at right angles with that of Fig. 1, showing the exhaust port and the ports leading to the pipes connecting the chest with the cylinder, the valve being shown in full lines in mid or closed position, and in dotted lines in position just at the point of opening.

In the drawings A represents the valve chest, the opposite ends of which are connected by the pipe 2, the ends of which are threaded into the body of the chest, as shown in Fig. 1, a short distance from the chest heads.

B is the valve having the stem 3, which passes through a stuffing box 4 in the head 5 of the chest, the opposite head 6 being solid as shown. The valve B is made up of three similar disks 7, 8 and 9, connected by narrowed or neck portions 11 and 12. These disks are provided with circumferential grooves 10 to receive and hold a lubricant conveyed into the chest preferably with the steam.

13 is the steam inlet port centrally located on one side of the chest A and leading to a circumferential conduit or groove 14, preferably circular in cross section, which communicates with the valve cylinder by means of the narrow circumferential opening 15. The advantage in having the opening from the conduit to the cylinder narrower than the conduit itself is, that free passage is allowed for the steam around the conduit, while its exit from the conduit into the cylinder is restricted, and thereby the pressure all around the valve is substantially uniform, whereas if the conduit was open full width to the cylinder the pressure would be greater directly at the point where it enters through the inlet port, and least at the point directly opposite. Consequently whether the valve is open or closed, the pressure is as nearly as practicable made equal or uniform on all sides, thereby preventing undue friction and warping of the parts.

The function of the enlarged circumferential conduit is that of permitting a practically unretarded, instantaneous and frictionless flow of steam in the conduit around the valve, in order that the steam may enter the cylinder through the groove on all sides simultaneously and, when the opening valve is but partially open and the steam has commenced to flow in, it may have no tendency to press only on that side of the valve nearest the supply pipe, and thereby press the valve over against the opposite side causing friction and binding thereof.

Symmetrically arranged on each side of the groove 14 are other circumferential grooves, the bottoms of which are preferably circular in cross section, and which open full width to the cylinder as shown. Communication is established when the valve is in proper position, between the groove 14 and the groove 17 through the part 16 around the neck 12 of the valve. The groove 17 communicates with the port 18, which communicates with the pipe 19 leading to the steam cylinder. Similarly through the part 20 of the cylinder, when the valve is shifted to opposite position, communication is established through the groove 14 to the similar groove 21, which is in communication with the port 22, leading by means of the pipe 23, to the opposite end of the steam cylinder.

While the pipes leading to the steam cylinders may be connected in any suitable way, I prefer to make the coupling as shown in Fig. 2.

The valve chest is provided with flanges 24 against which abut flanges 25, being secured by bolts 26. The flange 25 is provided with pipe turns or elbows corresponding to the pipes 19 and 23, and to these the pipes leading to the cylinder are coupled. By means of this construction it is possible to disconnect the valve chest from the pipes by simply disconecting the bolts 26.

Symmetrically arranged beyond the grooves 17 and 21 toward the ends of the valve chest, are the grooves 29 and 34, also preferably circular in cross section with the narrowed outlets 28 and 33 to the valve cylinder. Communication is established between the grooves 17 and 21 and the grooves 29 and 34 respectively, according to the position of the valve, through the parts 27 and 32 of the valve cylinder, around the necks 11 and 12 of the valve. The groove 29 communicates by means of the passage 30 with the outlet port 31 of the chest, and the groove 34 by means of the passage 35 with the same outlet. The inlet and outlet ports 13 and 31 are preferably coupled to their respective pipes by means of the flanges 36 and 37 secured to corresponding flanges in the same manner as described with reference to the ports 18 and 22.

As shown in full lines in Fig. 1, the valve stands in open position with the steam passing from the inlet port out through the port 18 and its connected pipe, while the steam is free to exhaust from the steam cylinder through the pipe 23, the port 22, the groove 21, the groove 34, the passage 35 and the exhaust or outlet port 31.

As shown in full lines in Fig. 2, the valve is in closed position with the inlet of steam cut off, but with the exhausts at both ends of the chest open, whereby any leakage of steam into the valve chest is free to exhaust without disturbing the position of the piston in the steam cylinder.

As shown by dotted lines in Fig. 2, the valve has been moved to just the point of opening for the inlet of steam to the groove 21 and pipe 23. It will be seen that when in this position before steam is admitted to one end of the chest, the exhaust is full open at the other end, so that there is absolutely free exhaust from one end of the steam cylinder before steam is admitted to the other. It will also be seen that when the valve is in the dotted line position the disk 7 fully overlaps the partition between the grooves 21 and 34, so as absolutely to prevent any leakage between them. This also enables the operator to work his valve lever through a considerable arc before the exhaust is opened, thus enabling him to use steam expansively in operating the piston.

The purpose of the peculiar construction of valve chest as shown, is to shorten as far as possible both the length of the valve and its travel. This is accomplished by having as narrow as possible, a slotted opening from the conduit 14 arranged centrally with reference to the conduit; also by having the grooves 17 and 21 open full width to the cylinder and by having the slotted opening from each of the conduits 29 and 34 on the side adjacent to the groove. The conduit 14 should be of such size that twice its area in cross section together with the area of the slot 15, which communicates directly with the inlet port 13, should be substantially equal to the area in cross section of each of the pipes leading from the steam chest to the cylinder. Also the area in cross section of the other grooves and conduits should be equal to or greater than that of the conduit 14. The area in cross section of the port 13 and its connecting pipe and also the area of the exhaust 31, should be materially greater than the area in cross section of each of the pipes connecting the steam chest with the cylinder. By this means full steam pressure is admitted to the valve chest without undue friction or wire drawing, and absolutely free exhaust from the chest.

Operation: The valve standing in the position indicated by full lines in Fig. 2, when it is desired to admit steam to the chest, the valve is moved in one direction or the other, (as indicated by the dotted lines in the drawings toward the lower end of the chest) as above described, before the steam is admitted through the opening 15 from the groove 14, the exhaust at the upper end of the chest is full closed, and the exhaust at the lower end of the chest is full open. As the valve is opened, the steam enters through the opening 15, from the groove 14 around the neck of the valve, and with substantially equal pressure. The valve is shown full open in Fig. 1 and in that position the steam passes from the groove 14 as above described, into the groove 17, thence downward through the port 18 and pipe 19 to the corresponding end of the steam cylinder, carrying the piston therein toward the opposite end, and causing the steam on the other side of the piston to exhaust through the pipe 23 to the groove 21, thence to the groove 34 through the passage 35 to the outlet port 31. As the valve is shifted in the chest the air and intermixed steam in the valve cylinder outside the disks 7 and 9 is caused to circulate to and fro through the pipe 2, so as not to obstruct the free movement of the valve. The space between the openings to the pipe 2 and the heads 5 and 6 form air cushions for the valve when moved to one extreme position or the other.

If the operator desires, after admitting steam to the cylinder, to use it expansively, he throws the valve lever to close the inlet without opening the exhaust at the end of the chest toward which the valve is moved, and as there is sufficient lap on the partitions between the grooves to require movement of the lever through a considerable arc between closing of inlet and opening of exhaust, the lever can be thus handled readily.

I claim—

1. The combination with the piston valve made up of three substantially similar disks connected by similar cylindrical necks, of the valve chest therein having a centrally arranged lateral inlet steam port, lateral outlet steam ports, symmetrically arranged one on each side of said inlet port, a circumferential groove communicating with each of said ports, and circumferential grooves beyond the other groove toward the ends of the chest each having an exhaust opening, substantially as described.

2. A piston valve chest having a lateral inlet steam port, and a circumferential conduit communicating with said port and also with said cylinder through a narrow circumferential slot, substantially as described.

3. A piston valve steam chest having lateral ports, circumferential conduits communicating with said ports, and with the valve cylinder through circumferential slots, said conduits being substantially circular in cross section.

4. The combination of the piston valve, made up of three similar disks connected by similar cylindrical necks, and the steam chest having a centrally arranged lateral steam inlet port, the circumferential conduit communicating with said port and with the interior of the valve chest through a narrow circumferential slot, the lateral outlet steam port on each side of said inlet port, the circumferential groove communicating with each of said outlet ports, the circumferential conduit between each said last named grooves and the end of the steam chest communicating with the chest by means of a narrow circumferential slot, and with an exhaust opening, substantially as described.

5. The combination of the piston valve, made up of three similar disks connected by similar necks, and the steam chest having a centrally arranged lateral steam inlet port, a lateral steam outlet port on each side of the inlet port and equi-distant therefrom, an exhaust opening beyond and equi-distant from each of said outlet steam ports, circumferential grooves or conduits for each of said ports, and exhaust openings, said disks and grooves being so arranged that when the valve is in mid position, the inlet of steam is entirely cut off, while both the exhaust openings are in communication with the outlet steam ports, and when the valve is at the point of opening to admit steam to one end of the chest, the exhaust at the other end of the chest is full open, substantially as described.

6. A piston valve chest having a centrally arranged steam inlet port, a circumferential conduit communicating with said port, a circumferential slot arranged centrally with reference to said conduit and connecting the same with the interior of the chest, a circumferential groove on each side of said conduit full open to the chest, a conduit beyond each groove having a circumferential slotted opening to the chest arranged in the side of the conduit next the adjacent groove, steam pipes connected to said grooves and leading to the ends of the steam cylinder and the exhaust port communicating with said conduits beyond said groove, substantially as described.

7. A piston valve chest having lateral inlet and outlet steam ports, an exhaust port, circumferential grooves or conduits for each of said ports, the area in cross section of said inlet port and exhaust port being greater than the area in cross section of each outlet steam port, and double the area in cross section of the conduit communicating with the inlet steam port together with the area of that part of its slotted opening which communicates directly with said inlet port, being substantially equal to the area in cross section of each outlet port, and the area in cross section of each of the other conduits or grooves being equal to or greater than that of said first named conduit, substantially as described.

In testimony whereof I have hereunto set my hand this 30th day of December, 1893.

SAMUEL O. JONES.

Witnesses:
 T. D. MERWIN,
 H. S. JOHNSON.